Patented Mar. 4, 1930

1,749,474

UNITED STATES PATENT OFFICE

JUNIUS D. EDWARDS, OF OAKMONT, PENNSYLVANIA, ASSIGNOR TO ALUMINUM COMPANY OF AMERICA, OF PITTSBURGH, PENNSYLVANIA, A CORPORATION OF PENNSYLVANIA

BALLOON ENVELOPE

No Drawing. Application filed September 6, 1927. Serial No. 217,875.

This invention relates to sheets of materials or fabrics intended to be relatively impermeable to gases, and particularly such materials as are to be used in the construction of the gas containers employed in aircraft of the lighter-than-air type. Its chief object is to provide improved gas-retaining materials which will be relatively impervious to gases. The invention is based on the discovery that the gas-retaining properties of the coating material used in these sheets and fabrics can be greatly improved by the incorporation of aluminum bronze powder.

One of the commonly employed materials for holding hydrogen and helium in lighter-than-air caft is the well known rubber-coated balloon fabric. This fabric generally consists of two and sometimes three plies of cotton cloth, with a film of rubber between the plies, and with a rubber coating on the outside and inside of the compound fabric. The rubber coatings applied to the outside of the fabric are for the purpose of appearance and protection and add little or nothing to the gas-retaining properties of the fabric. The rubber film between the plies is of substantial thickness, and it is this film of rubber, frequently known as the "gas film," which prevents the rapid escape of hydrogen through the fabric.

A typical fabric of this character is built up with two plies of cotton cloth of special weave, with approximately 3.4 ounces per square yard of rubber compound between the plies.

For purposes of strength, and particularly to increase the tearing resistance of the compound fabric, one ply is laid on the bias. A thin film of rubber, say 0.3 ounce per square yard, is applied to the under side of the two-ply fabric, and a similar but somewhat thicker coating, say 0.4 ounce per square yard, to the top of the outer ply of cloth. For purposes of protection, this outer coating is usually pigmented, and it has been common practice to apply rubber compound mixed with aluminum bronze powder as a finishing coat. This aluminum bronze powder is non-transparent and protects the rubber film and fabric from destruction by the actinic rays of sunlight. Furthermore, it is highly reflecting and helps to minimize any temperature changes of gas in the balloon which would result from changes in the solar energy absorbed by the fabric. This outer coating of rubber, as previously explained, is very thin and adds little or nothing to the gas-retaining properties of the finished fabric, even though it contains aluminum bronze powder. The woven surface of the cloth presents a very uneven surface of crossed threads with some fuzz or nap sticking up, and it is only after a coating of substantial thickness is applied to such a surface that it becomes "gas tight."

It is with the "gas film" or gas-retaining rubber layer between the plies of fabric that my invention is concerned. This film is generally applied in layers at the rate of about 0.2 to 0.3 ounce of rubber compound per square yard per layer. If, therefore, a film of rubber to the extent of 3 ounces per square yard is to be built up, it would be put on in 10 to 15 or more separate coats. This rubber film is generally made from a mixture of pure Pará or crepe rubber compounded with about 3 per cent sulphur and sometimes a little litharge, and then mixed to the consistency of a dough with a suitable rubber solvent. The rubber compound is applied to the fabric by a spreading machine such as is well known in the art. After rubber-coating and assembling the plies, the fabric is finished by vulcanizing in a steam-heated chamber.

The application of the rubber compound in many thin coats reduces to a minimum the possibility of holes or channels in the rubber film through which hydrogen might escape. Hydrogen is, however, appreciably soluble in the rubber compound employed, and will dissolve in the rubber, diffuse through it, and evaporate from the outer surface of the fabric. Therefore, even though the gas film is mechanically perfect, there is an appreciable and continuous diffusion of hydrogen through it. I have found, however, that if an appreciable proportion of aluminum bronze powder be incorporated in this rubber, that its permeability to hydrogen is very markedly decreased. Aluminum bronze powder consists of extremely thin and flake-like particles of aluminum, which are impermeable to hydrogen, and apparently the incorporation of an appreciable proportion of these aluminum flakes in the rubber film effectively decreases its permeability to hydrogen. This the flakes may do by very markedly increasing the diffusion path which hydrogen must follow in passing through a film. Whatever theory is used to explain the fact, it is true that the permeability of the film is greatly decreased by the non-permeable flakes.

For example, a 2-ply balloon fabric of customary construction had a permeability to hydrogen at 25° C. of 12 liters per square meter per 24 hours. These metric units are customarily employed for expressing the permeability of balloon fabrics. A second fabric of comparable construction, but which had aluminum bronze powder incorporated in the gas film, according to my invention, had a permeability of only about half this amount, namely, 5 liters per square meter per 24 hours.

In the production of a rubber-coated fabric according to this invention, one method is to apply to the fabric several—say 3 or 4—very thin layers of rubber compound without the addition of aluminum bronze powder; then the rubber compound containing about 4 per cent by weight of added aluminum bronze powder is applied in very thin layers, amounting in all to 3 or 4 ounces per square yard. A coating of rubber compound is then applied to the other fabric before it is applied as the bias ply.

Many variations of this technique may be employed, changing both composition of the rubber compound and the number of layers applied and the amount of aluminum bronze powder which is to be incorporated. Multiple-ply fabrics may also be built up with more than one gas-retaining film, and aluminum bronze powder may be incorporated in one or more of these inter-ply layers of rubber. Furthermore, my invention can be employed with single-ply fabrics, and in this case it is usually the custom to put the gas-retaining rubber film on the inside of the fabric, so that it will receive maximum protection from the fabric and the outer coating.

The invention is not limited to rubber-coated balloon fabrics, but may also be employed in decreasing the permeability of other materials to gases. One such example is the incorporation of aluminum bronze powder in sheets or films of the cellulose plastic type. The low permeability of such films to gases may be still further decreased by aluminum bronze powder. In general, where the hydrogen or other gas, to which it is desired to make the material impervious, is soluble in the material, the aluminum bronze powder properly applied will decrease the permeability. In the preceding discussion I have referred specifically to hydrogen and helium. Where it is desired to retain other gases, the aluminum bronze powder is also effective.

Aluminum bronze powder is particularly suitable for use in rubber-coated fabrics because it is of low specific gravity and has no injurious effect upon the rubber as has copper bronze powder. However, other finely divided flake-like materials such as, for example, copper bronze powder, may be effectively employed to render other materials impervious to gases where the copper has no objectionable chemical action.

It is to be understood that the invention is not limited to the specific details herein described but can be practiced in other ways without departure from its spirit.

I claim:

1. A gas-retaining balloon-envelope made of fabric bearing a gas-retaining coating composed of rubber having flake-like metallic particles distributed throughout a substantial portion of its thickness.

2. A gas-retaining balloon-envelope made of fabric bearing a gas-retaining coating composed of rubber having flake-like particles of aluminous metal distributed throughout a substantial portion of its thickness.

3. A gas-retaining balloon-envelope made of fabric bearing a gas-retaining coating composed of rubber having flake-like particles of aluminum bronze powder distributed throughout a substantial portion of its thickness.

JUNIUS D. EDWARDS.